United States Patent [19]

Doss et al.

[11] 3,993,613

[45] Nov. 23, 1976

[54] ADHESIVE COMPOSITION

[75] Inventors: Richard C. Doss; Lawrence D. Jurrens, both of Bartlesville, Okla.

[73] Assignee: Phillips Petroleum Company, Bartlesville, Okla.

[22] Filed: Feb. 24, 1975

[21] Appl. No.: 552,336

[52] U.S. Cl. ............................ 260/27 R; 260/27 BB; 260/31.8 T; 260/33.6 A; 260/38; 260/846; 260/31.8 R
[51] Int. Cl.² ........................................ C08L 93/10
[58] Field of Search ............... 260/27 BB, 27 R, 23, 260/31.8 R, 846, 33.6 A, 31.8 T

[56] References Cited
UNITED STATES PATENTS

| | | | |
|---|---|---|---|
| 3,554,940 | 1/1971 | Arakawa | 260/5 |
| 3,686,107 | 8/1972 | Russell | 260/27 BB |
| 3,736,281 | 5/1973 | Russell | 260/27 R |

*Primary Examiner*—Lewis T. Jacobs
*Assistant Examiner*—William E. Parker

[57] ABSTRACT

An adhesive composition is disclosed consisting essentially of a rubbery radial teleblock copolymer of a conjugated diene monomer and a vinyl-substituted aromatic monomer, a tackifier and a tackifier modifier, the latter being a polyalkene having a weight average molecular weight of about 200 to about 3000, said alkene having 2 to about 8 carbon atoms.

9 Claims, No Drawings

3,993,613

ADHESIVE COMPOSITION

This invention relates to adhesive compositions. More particularly, it relates to pressure-sensitive or hot melt adhesives based on radial teleblock copolymer rubbers.

BACKGROUND OF THE INVENTION

Various adhesive compositions are known in the art. Some of these known adhesives contain a synthetic rubber, a tackifier and a solvent. For some applications, the tack and the tack retention are important features. To improve these properties as compared to known adhesive formulations thus is desirable.

THE INVENTION

It is one object of this invention to provide new adhesive compositions.

Another object of this invention is to provide new adhesive compositions having high tack and tack retention.

In accordance with this invention, we have now found that an adhesive composition consisting essentially of a radial teleblock copolymer of a conjugated diene monomer and a vinyl-substituted aromatic monomer, a tackifier and a tackifier modifier being a polyalkene having a weight average molecular weight of about 200 to about 3,000, said alkene having 2 to about 8 carbon atoms, possesses improved tack and tack retention compared to adhesives comprising either only the tackifier and no polyalkene or only the polyalkene and no tackifier.

The rubbery radial teleblock copolymers useful in accordance with this invention have the general formula $$(AB)_xY$$

wherein A is a block of polymerized vinyl-substituted aromatic monomers having 8 to about 18 carbon atoms, B is a block of a polymerized alkadiene having 4 to about 12 carbon atoms, Y is the radical of a polyfunctional coupling agent, and $x$ is an integer of at least 3. It is to be emphasized that the blocks A and B do not have to be and usually are not entirely pure. Rather, it is assumed that in the area where these two blocks are connected some monomers of the other block are sprinkled in. The presently preferred rubbers are radial teleblock copolymers of styrene and either butadiene, isoprene or butadiene and isoprene. This rubber contains from about 50 to about 95 weight percent, preferably 55 to 75 weight percent, conjugated diene or mixture thereof and about 50 to about 5, preferably 35 to 25, weight percent of styrene. The weight average molecular weight of the preferred rubber is from about 150,000 to 350,000. The preparation of the rubber polymers useful in the adhesive composition of this invention is described in detail in U.S. Pat. No. 3,639,521.

The radical Y is a polyfunctional radical derived from a polyfunctional coupling agent. Several such agents are known in the art. For the presently preferred rubber, Y is silicon derived from $SiCl_4$. Other useful coupling agents are tin tetrachloride and epoxidated linseed oil.

Any tackifier known from the art of adhesive compositions is useful as the tackifier component for the adhesive composition of the present invention. Examples for such tackifiers are hydrocarbon resins, such as polyterpenes, poly (vinyl aromatics), chlorinated hydrocarbon resins, phenolic resins, such as phenol/aldehyde resins, coumarone/indene resins, modified and unmodified rosins and derivatives thereof, rosin, rosin esters of polyols such as ethylene glycol, polyethylene glycol, glycerol, or pentaerythritol, hydrogenated rosins, hydrogenated rosin esters, dehydrogenated rosins, methylated rosin esters and mixtures thereof. Presently preferred tackifiers are pentaerythritol ester of hydrogenated rosin, and tall oil rosin.

In accordance with this invention, the adhesive composition contains a tackifier modifier being a polyalkene, the alkene having from 2 to about 8 carbon atoms. The preferred range of the weight average molecular weight of said polyalkene is about 300 to about 2,000. Useful low molecular weight polyalkenes comprise homopolymers, copolymers, and terpolymers of ethylene, propylene, 1-butene, cis-2-butene, trans-2-butene, isobutylene, pentenes, hexenes, heptenes and octenes, and mixtures thereof. The polyalkene presently preferred is a polybutene or a polymerized mixture of butenes.

In addition to the main ingredients, namely, the rubbery polymer, the tackifier and the low molecular weight polyalkene (tackifier modifier), the adhesive composition of this invention can contain other additives. For instance, pigments, wetting agents, antioxidants, curatives, reinforcing agents, or fillers can be added. The kind and quantity of such additives depends upon the ultimate use or application of the adhesive composition.

The adhesive compositions of this invention will generally contain the above-described ingredients in the following proportions:

| Component | Parts by Weight |
| --- | --- |
| Rubbery copolymer | 50 to 100 |
| Tackifier | 25 to 100 |
| Polyalkene | 10 to 100 |

The adhesive composition of this invention can be prepared by a thorough mixing of the indicated ingredients in any suitable manner and can be applied to appropriate substrates in various ways. The composition can be emulsified, e.g. by mixing it with an emulsifying agent and an agent forming the continuous phase. The solids content of a latex usually lies in the range of about 5 to about 40 weight percent based on the latex.

The adhesive composition can also be used as a hot melt adhesive.

If the adhesive composition of this invention is used as a solution, the composition is dissolved in an inert, organic solvent. Useful solvents include paraffinic, cycloparaffinic and aromatic hydrocarbons, such as pentane, hexane, octane, methylcyclopentane, cyclohexane, benzene, toluene, xylene and mixtures thereof. Other liquid organic solvents such as halogenated hydrocarbons, ethers, esters, ketones, and the like can also be employed as a solvent for the adhesive composition of this invention. The amount of solvent used can vary in broad ranges and depends upon the viscosity of the adhesive solution desired. Generally, the amount of solvent is in the range of about 40 to about 90 weight percent based on the adhesive solution.

The invention will be more fully understood from the following examples which are intended to illustrate the invention but not to limit same.

EXAMPLE I

The ingredients shown in the following table were placed in a flask. The closed flask was put on a mechanical tumbler to thoroughly mix the ingredients.

Recipe

| Component | Parts by Weight | | |
|---|---|---|---|
| | 1 | 2 | 3 |
| Rubbery radial teleblock copolymer[a] | 10 | 10 | 10 |
| Tackifier[b] | 5 | 10 | 0 |
| Polyalkene[c] | 5 | 0 | 10 |
| Stabilizer[d] | 0.1 | 0.1 | 0.1 |
| Solvent[e] | 46.6 | 46.6 | 46.6 |

[a]70/30 Butadiene/styrene radial teleblock copolymer of 300,000 weight average molecular weight prepared by first polymerizing the styrene via alkyllithium initiation, followed by addition of butadiene to the reactor and polymerization thereof and followed by addition of silicon tetrachloride as coupling agent.
[b]Pentaerythritol ester of hydrogenated rosin.
[c]Polybutene (Indopol L-10) M.W. 320.
[d]Octadecyl B (3,5-di-t-butyl-4-hydroxyphenyl)propionate.
[e]80/20 Naphtha/toluene.

The three adhesive compositions were then applied as 0.001 to 0.002 inch thick films using a Bird applicator onto substrates of polyethylene terephthalate film (Mylar). The Bird applicator was set at 0.006 inch and the Mylar film had a thickness of 0.001 inch. The applied adhesive was allowed to dry at room temperature overnight. The testing results are recorded in the following table.

Table I

| Composition No. | Tack | | | | Creep[c] |
|---|---|---|---|---|---|
| | Probe[a] | | Rolling Ball[b] | | |
| | 0 Days | 7 Days | 0 Days | 7 Days | |
| 1 (Invention) | 440 | 450 | 0.6 | 2.3 | 2.3 |
| 2 | 960 | 257 | >5 | >5 | 3.3 |
| 3 | 47 | 62 | 2.2 | 4.5 | [d] |

[a]Measured using Polyken Probe tack tester manufactured by Testing Machines, Inc. Test conditions were: probe speed: 1 cm/sec; dwell time: 1 sec; contact force: 100 gm/cm²; higher numbers represent a higher degree of tack.
[b]Measured in inches as described in Pressure Sensitive Tape Council publication PSTC-6 (10/64); higher numbers represent a lower degree of tack.
[c]Measured as time in hours at 105° C. for 1/16 inch slippage when 1 inch² of adhesive on Mylar film backing is bonded to stainless steel and loaded in shear with a 2 lb. weight. Thus, higher numbers represent better creep resistance.
[d]Not determined.

The results shown above indicate that the adhesive composition of this invention provides a higher tack and lower rolling ball tack than the one observed in comparative composition 3 employing only polybutene with the rubbery copolymer. It can also be seen that the retention of probe tack on aging for 7 days at 158° F. is improved over the comparative composition 2. The creep resistance of the adhesive composition of the invention is only slightly lower than that of the prior art composition 2. Also, the rolling ball tack and the respective tack retention of the adhesive composition 1 of the present invention can be seen to be considerably better than the respective properties of the two comparative adhesives (Nos. 2 and 3).

EXAMPLE II

The ingredients shown in the following table were thoroughly mixed in a Baker-Perkins mixer with dispersion blades.

Recipe

| Component | Parts by Weight | |
|---|---|---|
| | 4 | 5 |
| Rubbery copolymer[d] | 100 | 100 |
| Tackifier[a] | 100 | 100 |
| Polyalkene[b] | 50 | 0 |
| Stabilizer[c] | 5 | 5 |

[a]Tall oil rosin.
[b]Polybutene (Indopol L-10) M.S. 320.
[c]4/1 Alkylated arylated bisphenolic phosphite/dilauryl thiodipropionate.
[d]The radial teleblock copolymer used in this example was a 70/30 butadiene/styrene radial teleblock copolymer of 167,000 weight average molecular weight prepared by using incremental monomer addition and silicon tetrachloride as coupling agent as described in footnote [a] of the Recipe in Example 1.

The two compositions of which the composition 4 is in accordance with this invention and the composition 5 serves for comparison were heated to 375° F. on a 0.002 polyethylene terephthalate film (Mylar). The molten adhesives were spread to 0.001 to 0.003 inch thick film with a 0.0015 inch Bird applicator. The adhesives were allowed to cool to room temperature. The test results obtained with these adhesives are shown in the following table.

Table II

| Composition No. | Rolling Ball Tack | | Creep[a] |
|---|---|---|---|
| | 0 Days | 7 Days | |
| 4 (Invention) | 0.4 | 1.0 | 10.0 |
| 5 | 0.2 | >8 | [b] |

[a]Creep measured as in Table I, Footnote c, except at 50° C. with 100 gm weight.
[b]Not determined.

The data of the table show that the adhesive composition of this invention shows a better tack retention after aging 7 days at 158° F. compared to the prior art composition.

EXAMPLE III

A series of compositions were formed by mixing the ingredients as shown in the following recipe in a Baker-Perkins mixer using dispersion blades. The same rubbery copolymer as described in Example II was used in this example also.

Recipe

| Component | Parts by Weight |
|---|---|
| Rubbery radial teleblock copolymer | 100 |
| Tackifier[a] | Variable |
| Polyalkene[b] | Variable |
| Stabilizer[c] | 5 |

[a]Tall oil rosin.
[b]Polybutene (Indopol L-10) M.W. 320 except as noted.
[c]4/1 Alkylated arylated bisphenolic phosphite/dilauryl thiodipropionate.

The test methods in this example were the same as those applied in Example II. The results of these tests are shown in the following table.

Table III

| Comp. No. | Tackifier Parts by Wt. | Polyalkene Parts by Wt. | Rolling Ball Tack | | Creep[a] |
|---|---|---|---|---|---|
| | | | 0 Days | 7 Days | |
| 6 | 100 | 10 | 0.2 | >8 | 8.0 |
| 7 | 100 | 25 | 0.1 | >8 | 2.6 (4.1)[c] |
| 8 | 100 | 50 | 0.1 | 0.5 | 8.0 |
| 9 | 100 | 75 | 0.1 | 0.2 | 3.0 (0.3) |
| 10 | 100 | 50 | 0.1 | 0.5 | 8.0 |
| 11 | 75 | 50 | 0.1 | 0.1 | 5.4 |

Table III-continued

| Comp. No. | Tackifier Parts by Wt. | Polyalkene Parts by Wt. | Rolling Ball Tack 0 Days | Rolling Ball Tack 7 Days | Creep[a] |
|---|---|---|---|---|---|
| 12 | 75 | 50[b] | 0.2 | 0.2 | >5.4 |

[a]Creep measured as in Table II, footnote a.
[b]Polybutene (Indopol L-14) M.W. 335.
[c]Values in parentheses are repeat determinations using same batch of composition.

From the data of the above shown table, it can be seen that by varying the ratio of tackifier to polyalkene, the various combinations of tack retention and creep resistance can be formulated.

EXAMPLE IV

A hot melt adhesive was prepared by thoroughly mixing the ingredients shown in the following table in a Baker-Perkins mixer with dispersion blades. This time the polybutene used had a higher molecular weight than the one used in the previous examples. The rubber copolymer base was the same as in the previous Examples II and III.

Recipe

| Components | Parts by Weight |
|---|---|
| Rubbery copolymer | 100 |
| Tackifier[a] | 100 |
| Polyalkene[b] | Variable |
| Stabilizer[c] | 5 |

[a]Tall oil rosin.
[b]Polybutene (Indopol H-300) M.W. 1290.
[c]4/1 Alkylated arylated bisphenolic phosphite/dilauryl thiodipropionate.

The testing methods for these compositions with variable polyalkene content were the same as the ones used in the Examples II and III. The test results are shown in the following table.

Table IV

| Comp. No. | Polyalkene Parts by Wt. | Rolling Ball Tack 0 Days | Rolling Ball Tack 7 Days | Creep[a] |
|---|---|---|---|---|
| 13 | 25 | 0.1[b] | 1.9[b] | 0[b] |
| 14 | 50 | 0.1[b] | 1.5[b] | 0[b] |

[a]Creep measured as in Table II, footnote a.
[b]Defective film was prepared, therefore results are questionable.

The results given above show that even though the adhesive film was defective, good tack and reasonable tack retention were obtained using higher molecular weight polybutene in the formulation than that used in Examples I–III.

Reasonable variations and modifications which will be apparent to those skilled in the art can be made in this invention without departing from the spirit and scope thereof.

We claim:
1. An adhesive composition consisting essentially of
   a. a rubbery, radial teleblock copolymer of a conjugated alkadiene having 4 to about 12 carbon atoms and a vinyl-substituted aromatic monomer having 8 to about 18 carbon atoms,
   b. a tackifier selected from the group consisting of polyterpenes, poly(vinyl aromatics), chlorinated hydrocarbon resins, phenolic resins, coumarone-/indene resins, modified and unmodified rosins and derivatives thereof, rosin, rosin esters of polyols, hydrogenated rosins, hydrogenated rosin esters, dehydrogenated rosins, methylated rosin esters and mixtures thereof, and
   c. a tackifier modifier being a polyalkene selected from the group consisting of homopolymers and copolymers of alkene having 2 to about 8 carbon atoms per molecule and mixtures of said polymers, said polyalkene having a weight average molecular weight in the range of about 200 to about 3,000.

2. Adhesive composition in accordance with claim 1 wherein said rubbery radial teleblock copolymer is a butadiene/styrene radial teleblock copolymer.

3. Adhesive composition in accordance with claim 2 wherein the butadiene/styrene copolymer is a copolymer of about 50 to about 95 weight percent butadiene monomer and about 50 to about 5 weight percent styrene monomer and has a weight average molecular weight of about 150,000 to about 350,000.

4. Adhesive composition in accordance with claim 1 wherein the tackifier is a rosin-based tackifier.

5. Adhesive composition in accordance with claim 1 wherein said tackifier is selected from the group consisting of pentaerythritol ester of hydrogenated rosin and tall oil rosin.

6. Adhesive composition in accordance with claim 1 wherein said polyalkene is polybutene.

7. Adhesive composition in accordance with claim 6 wherein said polybutene has a weight average molecular weight of about 320.

8. Adhesive composition in accordance with claim 6 wherein said polybutene has a weight average molecular weight of about 1300.

9. Adhesive composition in accordance with claim 1 consisting essentially of about 50 to about 100 parts by weight of said rubbery, radial teleblock copolymers, about 25 to about 100 parts by weight of said tackifier and about 10 to about 100 parts by weight of said polyalkene.

* * * * *